United States Patent
Chen et al.

(10) Patent No.: US 10,809,487 B2
(45) Date of Patent: Oct. 20, 2020

(54) OPTICAL SYSTEM

(71) Applicant: TDK TAIWAN CORP., Taoyuan (TW)

(72) Inventors: Shu-Shan Chen, Taoyuan (TW);
Cheng-Kai Yu, Taoyuan (TW);
Chao-Chang Hu, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 238 days.

(21) Appl. No.: 16/007,315

(22) Filed: Jun. 13, 2018

(65) Prior Publication Data

US 2018/0356610 A1 Dec. 13, 2018

Related U.S. Application Data

(60) Provisional application No. 62/518,753, filed on Jun. 13, 2017.

(30) Foreign Application Priority Data

May 7, 2018 (CN) .......................... 2018 1 0427198

(51) Int. Cl.
*G02B 7/02* (2006.01)
*G02B 7/09* (2006.01)
*G02B 7/10* (2006.01)
*G02B 27/64* (2006.01)
*G02B 7/08* (2006.01)

(52) U.S. Cl.
CPC .................. *G02B 7/09* (2013.01); *G02B 7/08* (2013.01); *G02B 7/102* (2013.01); *G02B 27/646* (2013.01)

(58) Field of Classification Search
CPC . G02B 7/09; G02B 7/08; G02B 7/102; G02B 27/646; G02B 27/642; G02B 27/644; G03B 2205/0007
USPC .......................................... 359/557
See application file for complete search history.

(56) References Cited

U.S. PATENT DOCUMENTS

2018/0210163 A1* 7/2018 Jung .......................... G02B 7/08
2019/0377241 A1* 12/2019 Lee ............................ G03B 5/00

* cited by examiner

*Primary Examiner* — William R Alexander
*Assistant Examiner* — Henry A Duong
(74) *Attorney, Agent, or Firm* — Muncy, Geissler, Olds & Lowe, P.C.

(57) ABSTRACT

An optical system is provided and includes a fixed module, a movable module, a driving coil, an electrical circuit and a magnetic element. The fixed module includes a base and a circuit board, and the movable module includes an optical member holder, configured to hold an optical member. The magnetic element corresponds to the driving coil and is configured to generate an electromagnetic driving force to drive the optical member holder to move relative to the base. The driving coil and the electrical circuit are integrally formed in the circuit board. The driving coil partially overlaps the electrical circuit when viewed along a direction perpendicular to an optical axis of the optical member.

14 Claims, 7 Drawing Sheets

OPTICAL SYSTEM

CROSS REFERENCE TO RELATED APPLICATIONS

This application claims the benefit of U.S. Provisional Application No. 62/518,753, filed Jun. 13, 2017, and China Patent Application No. 201810427198.X, filed May 7, 2018, the entirety of which are incorporated by reference herein.

BACKGROUND OF THE DISCLOSURE

Field of the Disclosure

The present disclosure relates to an optical system, and more particularly to an optical system that has a circuit board and a plate coil which are integrally formed in one piece.

Description of the Related Art

As technology has progressed, many kinds of electronic devices such as tablet computers and smartphones have begun to include the functionality of digital photography or video recording. A user can operate the electronic device to capture various images through a camera module included in the electronic device.

The development of electronic devices with the function of photography has continuously tended toward miniaturization. In general, the camera module is composed of a lens holder, a plurality of magnets, a plurality of coils, a circuit board and other elements or members. These elements or members are stacked on top of each other along the same direction, for example, they are stacked along the direction of the optical axis of the lens. However, this way of stacking increases the overall height of the camera module, so that when the thickness of the electronic device needs to be reduced for the purpose of miniaturization, the height of the camera module cannot be further reduced.

Therefore, how to design the structure of the camera module to reduce the thickness of the camera module to achieve the purpose of miniaturization is a topic nowadays that needs to be discussed and solved.

BRIEF SUMMARY OF THE DISCLOSURE

Accordingly, one objective of the present disclosure is to provide an optical system, so as to solve the above problems.

According to some embodiments of the disclosure, an optical system includes a fixed module, a movable module, a driving coil, an electrical circuit and a magnetic element. The fixed module includes a base and a circuit board, and the movable module includes an optical member holder, configured to hold an optical member. The magnetic element corresponds to the driving coil and is configured to generate an electromagnetic driving force to drive the optical member holder to move relative to the base. The driving coil and the electrical circuit are integrally formed in the circuit board. The driving coil partially overlaps the electrical circuit when viewed along a direction perpendicular to an optical axis of the optical member.

According to some embodiments, when viewed along the optical axis, conducting wires of the electrical circuit do not overlap the driving coil. In addition, a thickness of the circuit board is slightly less than or equal to a thickness of the driving coil.

According to some embodiments, the driving coil includes a plurality of winding layers, and some of the winding layers are included in the electrical circuit.

According to some embodiments, the optical system further includes a position sensor, disposed on the circuit board, and when viewed along the direction perpendicular to the optical axis, the position sensor partially overlaps the driving coil.

According to some embodiments, the base includes an accommodating groove, configured to accommodate the position sensor and the driving coil. In addition, the base includes a blocking wall, and the blocking wall is disposed in the accommodating groove and is located between the position sensor and the driving coil.

According to some embodiments, the optical member holder further includes a metal contacting member, and the metal contacting member is configured to constrain the optical member holder in a limited position.

According to some embodiments, the movable module further includes a frame, the frame includes a protrusion, and the metal contacting member is in contact with the protrusion, so that the optical member holder is constrained in the limited position.

According to some embodiments, the movable module further includes a frame which surrounds the optical member holder, and the optical system further includes a first elastic member. The optical member holder is connected to the frame through the first elastic member, so that the optical member holder is suspended in the frame.

According to some embodiments, the optical system further includes a second elastic member, and the second elastic member is configured to connect the first elastic member and the fixed module. In addition, the second elastic member has a long strip-shaped structure.

According to some embodiments, the magnetic element includes a multipolar magnet. In addition, the optical system includes two position sensors configured to sense the movement of the optical member holder relative to the base.

In conclusion, the present disclosure provides an optical system, and the optical system includes an electrical circuit, a circuit board and a plate coil. The plate coil and the electrical circuit are integrally formed in the circuit board. Therefore, the overall height of the plate coil and the circuit board along the Z-axis direction can be reduced, thereby reducing the height of the optical system along the Z-axis direction, so as to achieve the purpose of miniaturization.

In addition, in some embodiments, some of the winding layers of the plate coil are included in the electrical circuit. That is, the electrical circuit in the circuit board and some of the winding layers of the plate coil share the area within the plate coil. Therefore, the lengths of the circuit board along the X-axis direction and the Y-axis direction can be reduced, so as to achieve the purpose of miniaturizing the optical system further.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
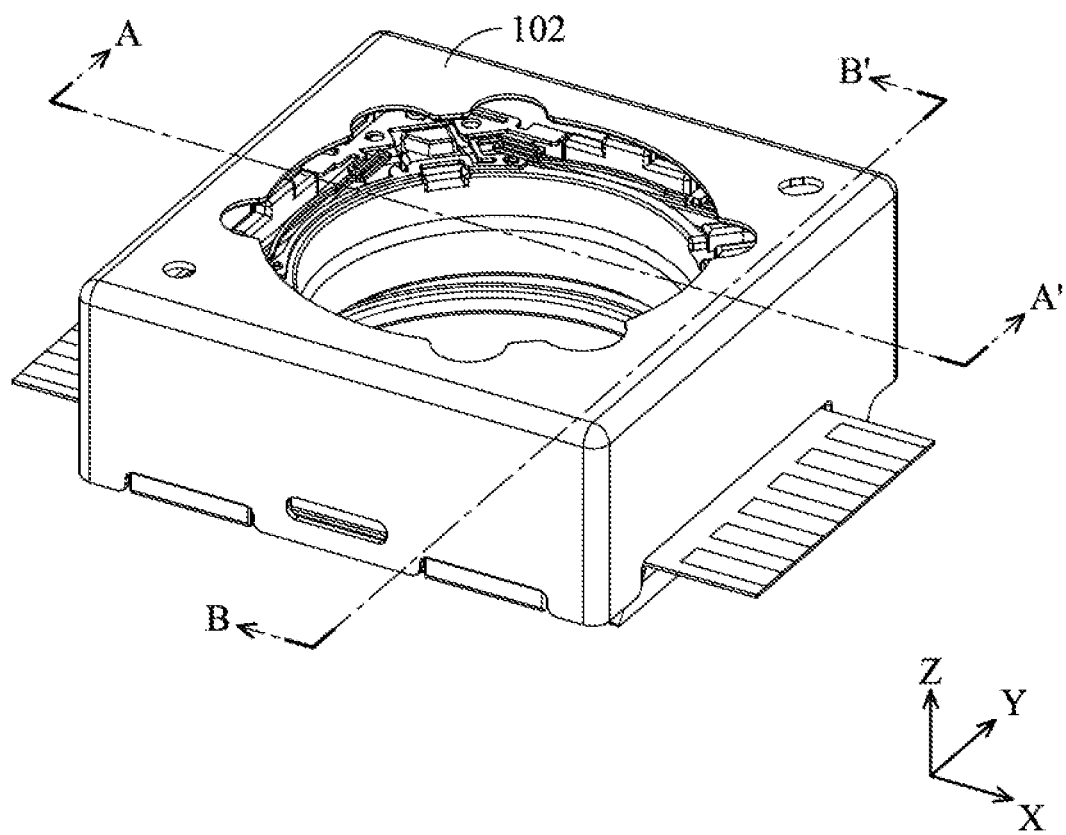
FIG. 1 shows a schematic diagram of an optical system according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
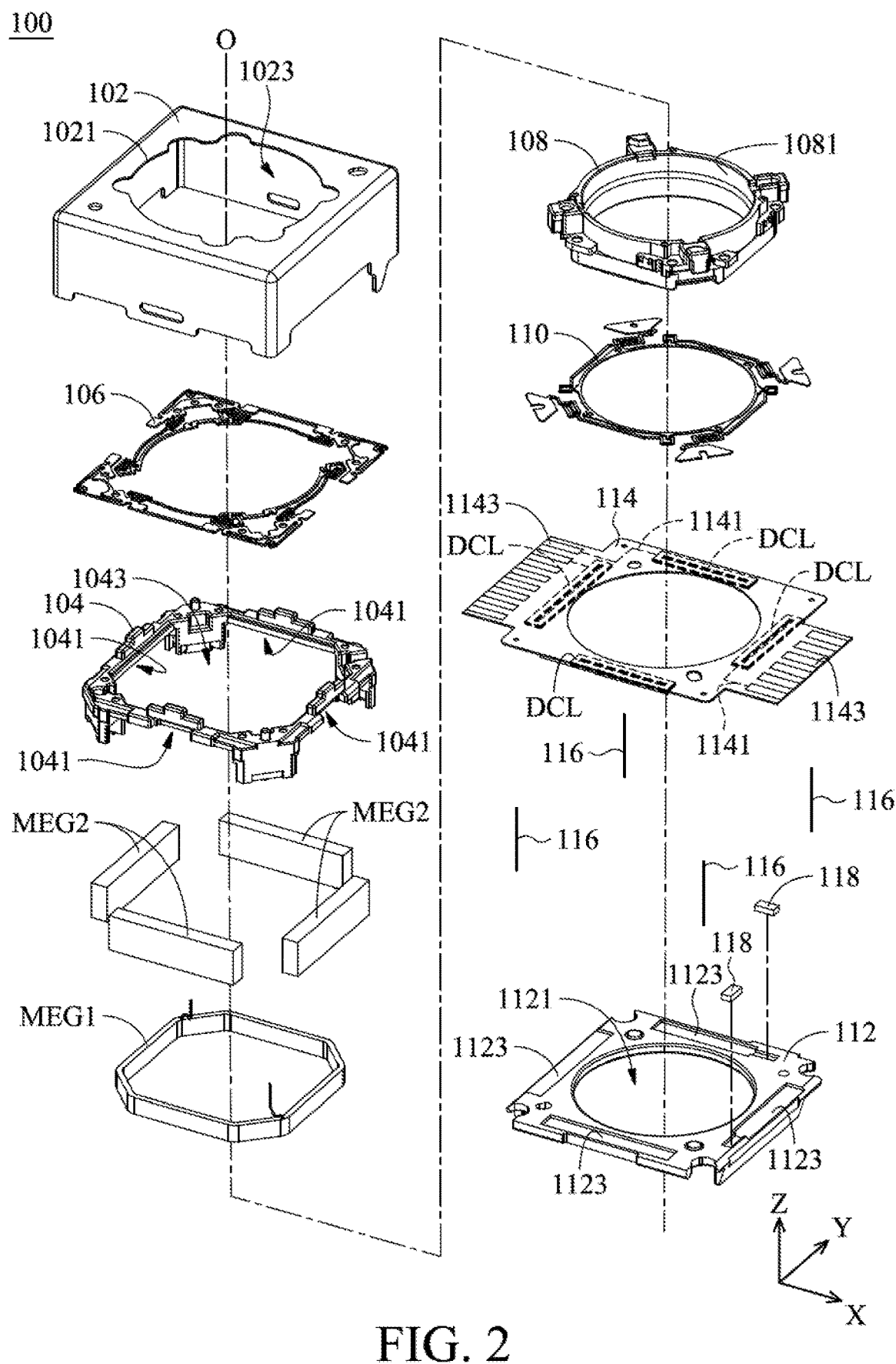
FIG. 2 shows an exploded diagram of the optical system according to the embodiment of the present disclosure.
Figure 3:
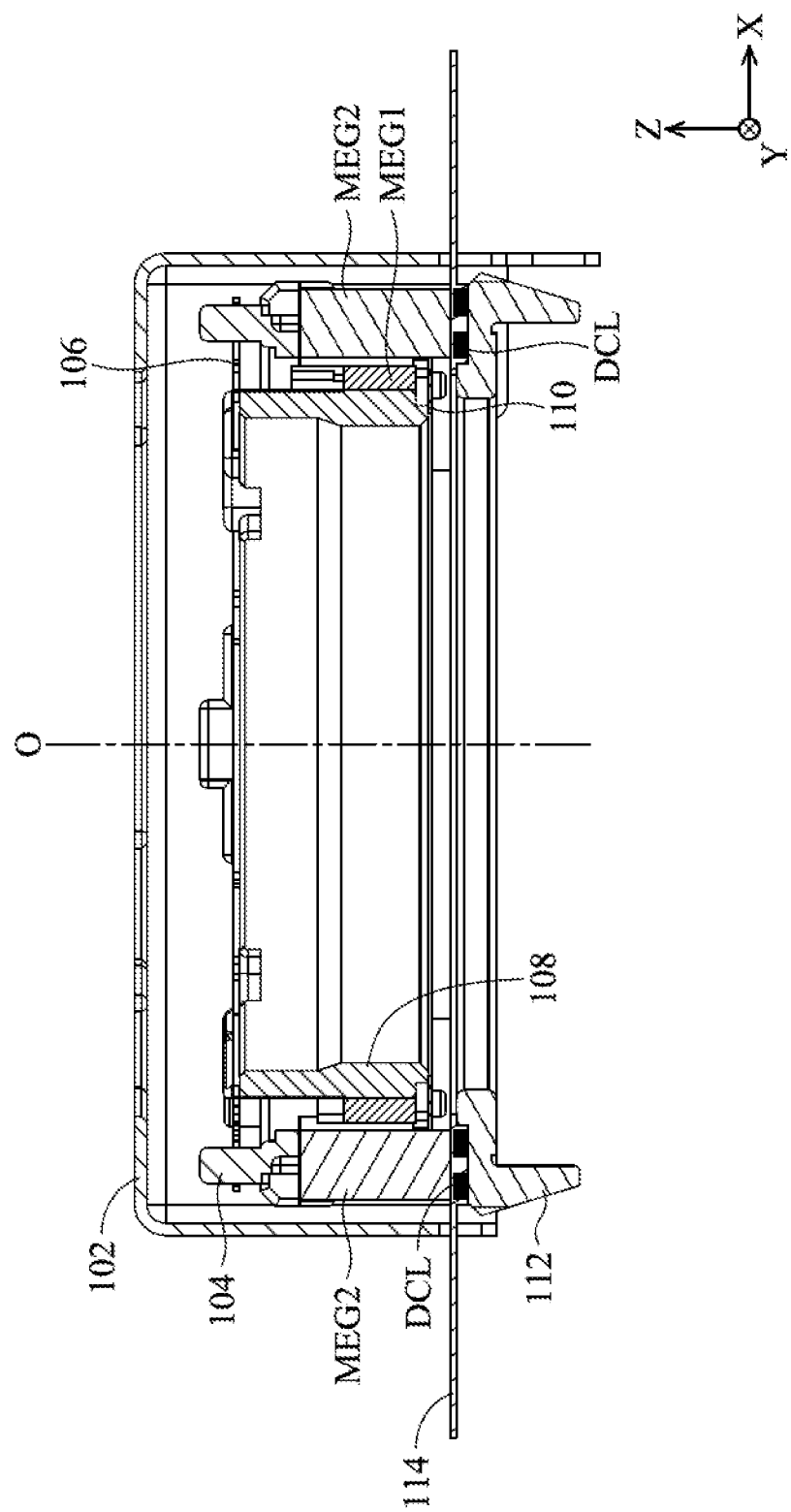
FIG. 3 shows a cross-sectional view along line A-A' in FIG. 1 according to the embodiment of the present disclosure.

Please refer to FIG. 1 to FIG. 3. FIG. 1 shows a schematic diagram of an optical system 100 according to an embodiment of the present disclosure, FIG. 2 shows an exploded diagram of the optical system 100 according to the embodiment of the present disclosure, and FIG. 3 shows a cross-sectional view along line A-A' in FIG. 1 according to the embodiment of the present disclosure. The optical system 100 can be a camera system with an optical driving assembly and can be configured to hold an optical member (such as a lens, not shown in the figures). The optical system 100 can be installed in different electronic devices or portable electronic devices, such as a smartphone or a tablet computer, for allowing a user to perform the image capturing function. In this embodiment, the optical driving assembly can be a voice coil motor (VCM) with an auto-focusing (AF) function, but it is not limited thereto. In some embodiments, the optical driving assembly of the optical system 100 can also perform the functions of auto-focusing and optical image stabilization (OIS).

Please continue to refer to FIG. 2, which shows an exploded diagram of the optical system 100 according to the embodiment of the disclosure. The optical system 100 includes a casing 102, a frame 104, an upper spring sheet 106, an optical member holder 108, a first magnetic element MEG1, four second magnetic elements MEG2, a lower spring sheet 110, a base 112 and a circuit board 114. In this embodiment, a fixed module of the optical system 100 can be defined to include the base 112 and the casing 102, and the base 112 is securely connected to the casing 102. The method for connecting the base 112 and the casing 102 can be rivet joint, engagement or welding, but it is not limited thereto. Any method that is capable of connecting the base 112 to the casing 102 is within the scope of the present disclosure. The fixed module can include other members in other embodiments, such as the circuit board 114. In addition, the optical member holder 108 and the frame 104 can collectively form a movable module, and the movable module can move relative to the fixed module.

The casing 102 has a hollow structure, and a casing opening 1021 is formed on the casing 102. A base opening 1121 is formed on the base 112. The center of the casing opening 1021 corresponds to an optical axis O of an optical element (not shown in the figures) which is held by the optical member holder 108. The base opening 1121 corresponds to an image sensing element (now shown in the figures) disposed below the base 112. The casing 102 can include an accommodating space 1023 for accommodating the frame 104, the upper spring sheet 106, the optical member holder 108, the first magnetic element MEG1, the second magnetic elements MEG2 and the low spring sheet 110. Furthermore, the casing 102 can also accommodate the circuit board 114 and the base 112. In addition, the first magnetic element MEG1 and the second magnetic elements MEG2 corresponding to the first magnetic element MEG1 can be defined as the optical driving assembly, which is electrically connected to the circuit board 114 and is configured to drive the optical member holder 108 to move along the optical axis O relative to the base 112.

As shown in FIG. 2, the optical member holder 108 has a hollow ring structure, and the optical member holder 108 has a through hole 1081. The through hole 1081 forms a threaded structure (not shown) corresponding to another threaded structure (not shown) on the optical member, so that the optical member can be locked in the through hole 1081. In this embodiment, the first magnetic element MEG1 surrounds the optical member holder 108. In addition, the frame 104 has a plurality of grooves 1041 and a central opening 1043. In this embodiment, the frame 104 has four grooves 1041 for accommodating the four second magnetic elements MEG2, but the number of the grooves 1041 and the second magnetic elements MEG2 is not limited thereto. In this embodiment, each of the second magnetic elements MEG2 has a long strip-shaped structure, but it is not limited thereto. For example, the second magnetic elements MEG2 can have different shapes in other embodiments.

The optical member holder 108 and the optical member are disposed in the central opening 1043 and can move relative to the frame 104. More specifically, as shown in FIG. 3, the optical member holder 108 is connected to the frame 104 through the upper spring sheet 106 and the low spring sheet 110, so as to be suspended in the central opening 1043. When the first magnetic element MEG1 is supplied with electricity, the four second magnetic elements MEG2 act with the first magnetic element MEG1 to generate the electromagnetic driving force, so as to drive the optical member holder 108 to move along the optical axis O (the Z-axis direction) relative to the frame 104 and the base 112, so as to perform the auto focusing function. In some embodiments, the second magnetic elements MEG2 can include at least one multipolar magnet, configured to act with the corresponding first magnetic element MEG1 to drive the optical member holder 108 to move along the optical axis O, so as to perform the focusing function.

It should be noted that the upper spring sheet 106 or the low spring sheet 110 can be a first elastic member. In this embodiment, the upper spring sheet 106 can consist of four detachable spring sheets, and the low spring sheet 110 can be integrally formed in one piece, but they are not limited thereto. For example, the upper spring sheet 106 can also be integrally formed in one piece in other embodiments.

As shown in FIG. 2, the circuit board 114 is disposed on the base 112. In this embodiment, the circuit board 114 can be a flexible printed circuit (FPC) board, but it is not limited thereto. In addition, the optical system 100 further includes an electrical circuit 1141 and four plate coils DCL which are disposed at the circuit board 114. In this embodiment, the plate coils DCL can serve as driving coils, and the electrical circuit 1141 and the four plate coils DCL are integrally formed on or within the circuit board 114. In this embodiment, the electrical circuit 1141 can be conducting wires on the circuit board 114 and is configured to be electrically connected to the plate coil DCL and at least one electrical contact 1143. As shown in FIG. 2, the circuit board 114 includes a plurality of electrical contacts 1143 configured to be connected to a main board (not shown) of the aforementioned electronic device. It should be noted that positions of the four plate coils DCL respectively correspond to the second magnetic elements MEG2.

In addition, as shown in FIG. 2, the optical system 100 further includes two second elastic members 116. Each of the second elastic members has a long strip-shaped structure, such as a column-shaped structure or a line-shaped structure, but the shape is not limited thereto. In this embodiment, one end of the second elastic member 116 is connected to the upper spring sheet 106, and the other end of the second elastic member 116 is connected to the circuit board 114. Based on the structural configuration, the optical member holder 108 with the optical member (not shown in the figures) and the frame 104 can move relative to the base 112 along the X-Y plane through the four flexible second elastic members 116.

In this embodiment, when the plate coils DCL in the circuit board 114 are supplied with electricity, the plate coils DCL act with the corresponding second magnetic elements MEG2 to generate the electromagnetic driving force, so as to drive the optical member holder 108, the optical member and the frame 104 to move along the X-Y plane. As a result, when the optical system 100 is shaken, the optical member holder 108 can be driven by the electromagnetic driving force to move along the X-Y plane, so as to compensate for the movement of the optical system 100 that is a result of the shaking, and the purpose of optical image stabilization (OIS) can be achieved. In addition, the optical system 100 can also include at least one position sensor 118 configured to sense the movement of the optical member holder 108 relative to the base 112. In this embodiment, the optical system 100 can include two position sensors 118 configured to sense the movements of the optical member holder 108 relative to the base 112 along the X-axis and along the Y-axis, respectively. It should be noted that the number of position sensors 118 is not limited to this embodiment.

Figure 4:
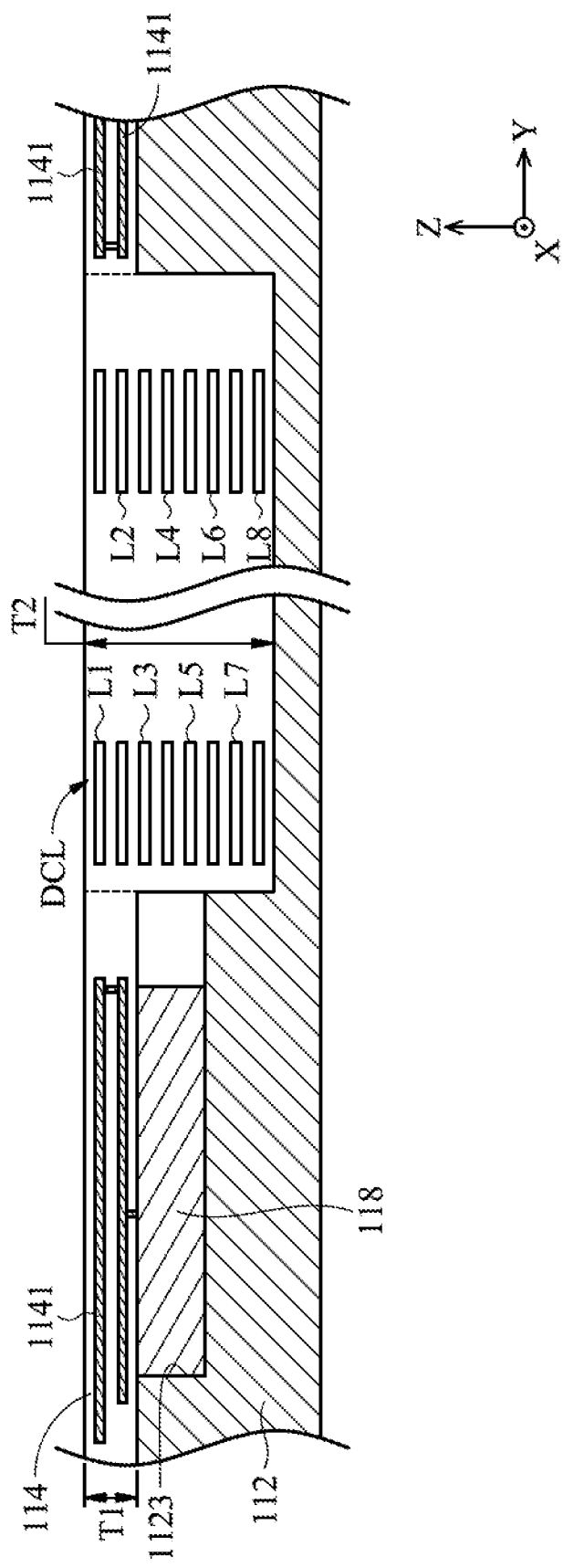
FIG. 4 shows a cross-sectional view along line B-B' in FIG. 1 according to the embodiment of the present disclosure.

Please refer to FIG. 2 to FIG. 4 together. FIG. 4 shows a cross-sectional view along line B-B' in FIG. 1 according to the embodiment of the present disclosure. For clarity, only the base 112, the circuit board 114, the plate coils DCL and the position sensor 118 are shown in FIG. 4. As shown in FIG. 2 and FIG. 4, a portion of the plate coil DCL is protruded from the main body of the circuit board 114 along the −Z axis direction, and the base 112 can further include four accommodating grooves 1123 configured to accommodate the corresponding plate coil DCL and the position sensor 118.

It should be noted that, as shown in FIG. 4, when viewed along a direction perpendicular to the optical axis O (for example, along the Y-axis direction), the plate coil DCL (the driving coil) partially overlaps the electrical circuit 1141, and the position sensor 118 overlaps a portion of the plate coil DCL. For example, as shown in FIG. 4, the plate coil DCL includes eight winding layers L1 to L8. When viewed along the Y-axis direction, the winding layers L1 and L2 overlap the electrical circuit 1141, and the windings layers L3 to L8 do not overlap the electrical circuit 1141. In addition, the position sensor 118 overlaps the winding layers L3 to L5 and does not overlap the winding layers L1, L2 and L6 to L8.

On the other hand, when viewed along the direction of the optical axis O, the electrical circuit 1141 does not overlap the plate coil DCL. That is, the electrical circuit 1141 is formed on the area outside of the plate coil DCL. Based on the configuration of design, the plate coil DCL and the corresponding second magnetic element MEG2 can provide a greater electromagnetic driving force.

In addition, as shown in FIG. 4, in this embodiment, the circuit board 114 has a thickness T1, the plate coil DCL has a thickness T2, and the thickness T1 of the circuit board 114 is slightly less than the thickness T2 of the plate coil DCL. However, in other embodiments, the thickness T2 of the plate coil DCL can also be equal to the thickness T1 of the circuit board 114. The thickness T1 and the thickness T2 depend on practical requirements.

In addition, because the plate coil DCL is integrally formed in the circuit board 114, the overall height of the plate coil DCL and the circuit board 114 along the Z-axis direction can be reduced, thereby reducing the height of the optical system 100 along the Z-axis direction, so as to achieve the purpose of miniaturization.

Figure 5:
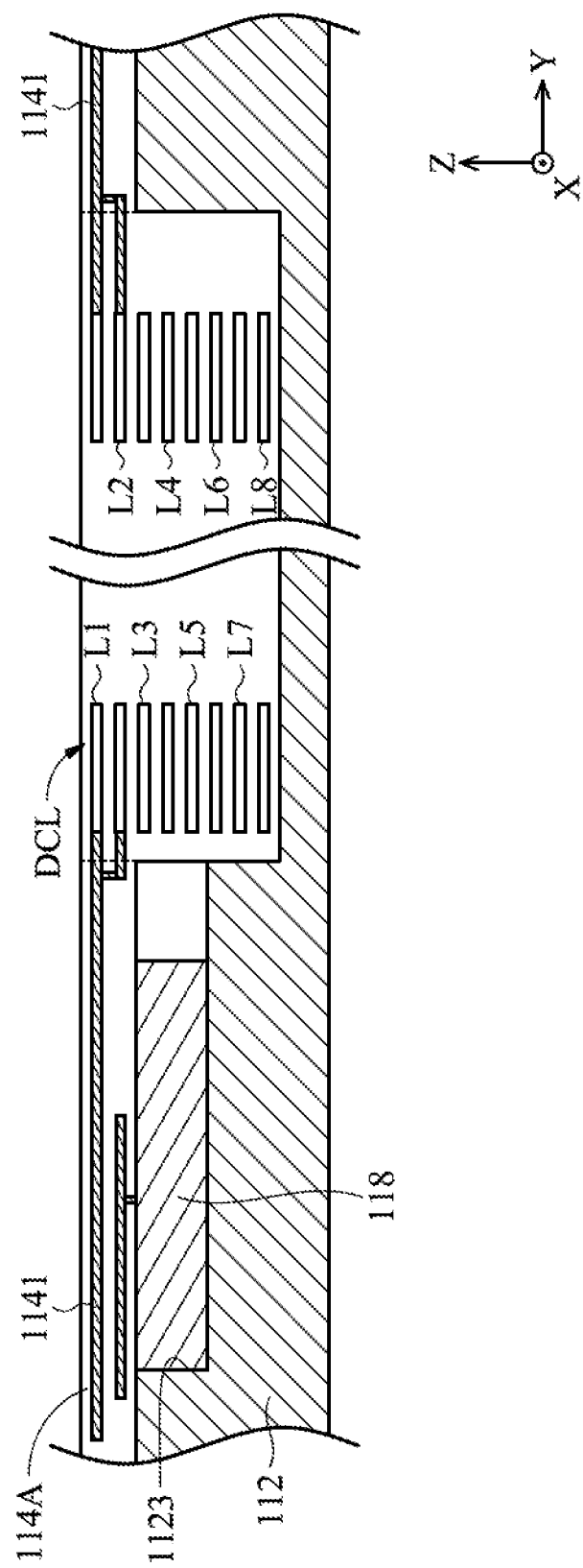
FIG. 5 shows a cross-sectional view of the base, a circuit board and the plate coil according to another embodiment of the present disclosure.

Please refer to FIG. 5, which shows a cross-sectional view of the base 112, a circuit board 114A and the plate coil DCL according to another embodiment of the present disclosure. This embodiment is similar to the embodiment of FIG. 4, and the difference is that some of the winding layers of the plate coil DCL are included in the electrical circuit 1141. As shown in FIG. 5, the winding layers L1 and L2 of the plate coil DCL are included in the electrical circuit 1141 and electrically connected to the conducting wires of the electrical circuit 1141.

Because the electrical circuit 1141 in the circuit board 114A and the winding layers L1 and L2 of the plate coil DCL share the area within the plate coil DCL (the area is defined between the two dotted lines in FIG. 5), this structural configuration can reduce the lengths of the circuit board 114A along the X-axis direction and the Y-axis direction, so as to achieve the purpose of miniaturizing the optical system 100 further.

Figure 6:
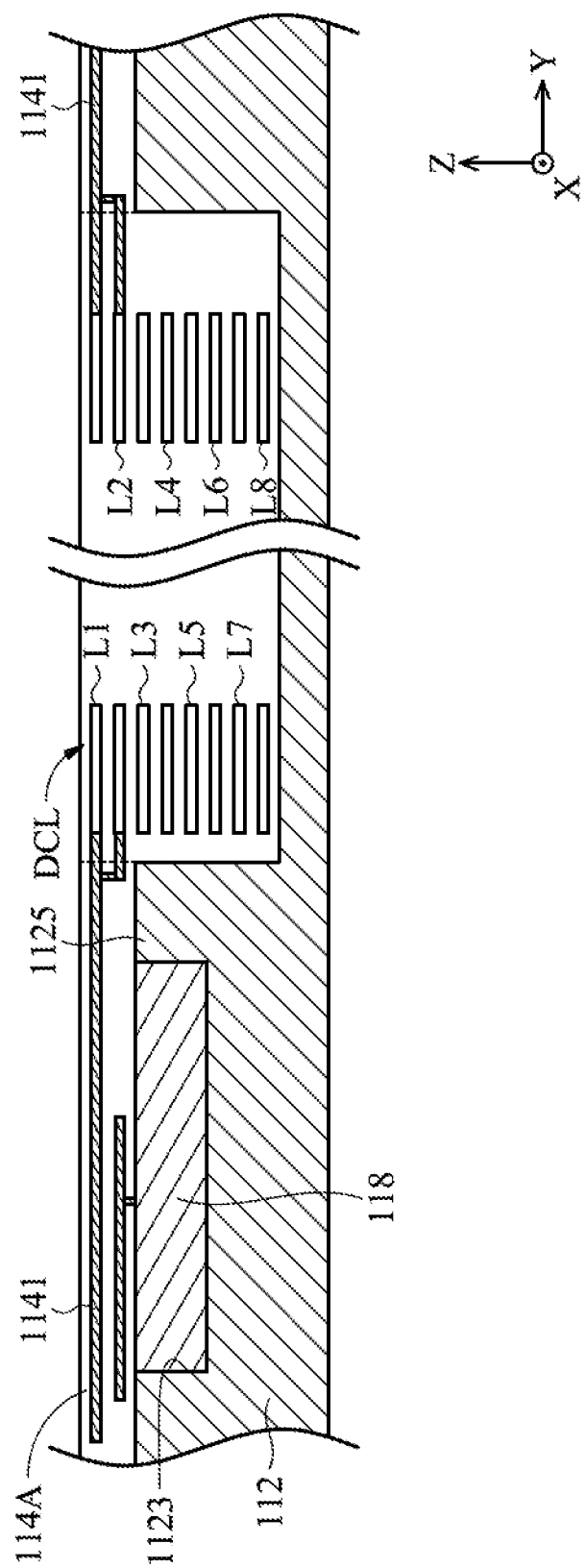
FIG. 6 shows a cross-sectional view of the base, the circuit board and the plate coil according to another embodiment of the present disclosure.

In addition, please refer to FIG. 6, which shows a cross-sectional view of the base 112, the circuit board 114A and a plate coil DCL according to another embodiment of the present disclosure. This embodiment is similar to the embodiment of FIG. 5, and the difference is that the base 112 can further include a blocking wall 1125 which is disposed in the accommodating groove 1123 and is located between the position sensor 118 and the plate coil DCL.

Figure 7:
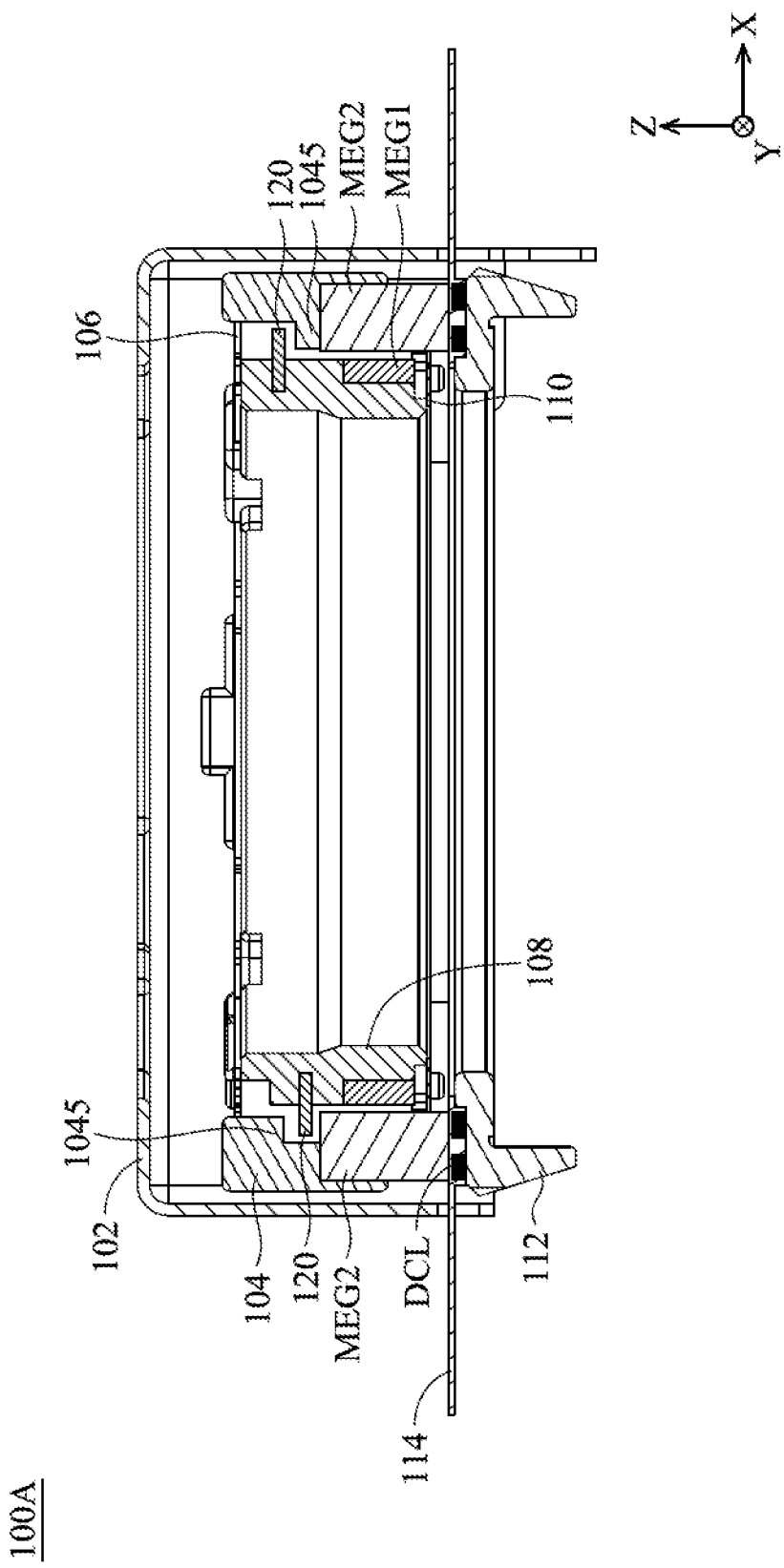
FIG. 7 shows a cross-sectional view of an optical system according to another embodiment of the present disclosure.

Please refer to FIG. 7, which shows a cross-sectional view of an optical system 100A according to another embodiment of the present disclosure. As shown in FIG. 7, the optical system 100A can further include two metal contacting members 120 which are disposed on two sides of the optical member holder 108. Specifically, the metal contacting members 120 are formed on the optical member holder 108 in the manner of insert molding. When the optical member holder 108 is moved along the Z-axis direction by the electromagnetic driving force, the metal contacting members 120 can constrain the optical member holder 108 in a limited position. For example, the metal contacting members 120 are in contact with protrusions 1045 of the frame 104 or the second magnetic elements MEG2, so that the optical member holder 108 is limited in an upper limit position or a lower limit position, so as to prevent the optical member holder 108 from colliding with other members in the optical system 100A and being damaged.

Because the metal contacting members 120 are made of a metal material, the metal contacting members 120 can have a higher strength than plastic, and the height of the optical member holder 108 along the Z-axis direction can be further reduced, so as to achieve the purpose of miniaturizing the optical system 100A.

In conclusion, the present disclosure provides an optical system, and the optical system includes an electrical circuit 1141, a circuit board 114 and a plate coil DCL. The plate coil DCL and the electrical circuit 1141 are integrally formed in the circuit board 114. Therefore, the overall height of the plate coil DCL and the circuit board 114 along the Z-axis direction can be reduced, thereby reducing the height of the optical system 100 along the Z-axis direction, so as to achieve the purpose of miniaturization.

In addition, in some embodiments, some of the winding layers of the plate coil DCL are included in the electrical circuit 1141. That is, the electrical circuit 1141 in the circuit board 114 and some of the winding layers of the plate coil DCL share the area within the plate coil DCL. Therefore, the lengths of the circuit board 114 along the X-axis direction and the Y-axis direction can be reduced, so as to achieve the purpose of miniaturizing the optical system 100 further.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a fixed module, comprising a base and a circuit board;
   a movable module, comprising an optical member holder, configured to hold an optical member;
   a driving coil;
   an electrical circuit; and
   a magnetic element, corresponding to the driving coil, configured to generate an electromagnetic driving force to drive the optical member holder to move relative to the base;
   wherein the driving coil and the electrical circuit are integrally formed in the circuit board, and the driving coil partially overlaps the electrical circuit when viewed along a direction perpendicular to an optical axis of the optical member.

2. The optical system as claimed in claim 1, wherein when viewed along the optical axis, conducting wires of the electrical circuit do not overlap the driving coil.

3. The optical system as claimed in claim 1, wherein a thickness of the circuit board is slightly less than or equal to a thickness of the driving coil.

4. The optical system as claimed in claim 1, wherein the driving coil includes a plurality of winding layers, and some of the winding layers are included in the electrical circuit.

5. The optical system as claimed in claim 1, wherein the optical system further comprises a position sensor disposed on the circuit board, and when viewed along the direction perpendicular to the optical axis, the position sensor partially overlaps the driving coil.

6. The optical system as claimed in claim 5, wherein the base includes an accommodating groove, configured to accommodate the position sensor and the driving coil.

7. The optical system as claimed in claim 6, wherein the base includes a blocking wall, and the blocking wall is disposed in the accommodating groove and is located between the position sensor and the driving coil.

8. The optical system as claimed in claim 1, wherein the optical member holder further includes a metal contacting member, and the metal contacting member is configured to constrain the optical member holder in a limited position.

9. The optical system as claimed in claim 8, wherein the movable module further comprises a frame, the frame includes a protrusion, and the metal contacting member is in contact with the protrusion, so that the optical member holder is constrained in the limited position.

10. The optical system as claimed in claim 1, wherein the movable module further comprises a frame which surrounds the optical member holder, and the optical system further comprises a first elastic member;
    wherein the optical member holder is connected to the frame through the first elastic member, so that the optical member holder is suspended in the frame.

11. The optical system as claimed in claim 10, wherein the optical system further comprises a second elastic member, and the second elastic member is configured to connect the first elastic member and the fixed module.

12. The optical system as claimed in claim 11, wherein the second elastic member has a long strip-shaped structure.

13. The optical system as claimed in claim 1, wherein the magnetic element includes a multipolar magnet.

14. The optical system as claimed in claim 1, wherein the optical system comprises two position sensors configured to sense the movement of the optical member holder relative to the base.

* * * * *